United States Patent [19]

Watari et al.

[11] 4,385,359

[45] May 24, 1983

[54] MULTIPLE-CHANNEL VOICE INPUT/OUTPUT SYSTEM

[75] Inventors: Masao Watari; Seibi Chiba, both of Tokyo, Japan

[73] Assignee: Nippon Electric Co., Ltd., Tokyo, Japan

[21] Appl. No.: 242,734

[22] Filed: Mar. 11, 1981

[30] Foreign Application Priority Data

Mar. 18, 1980 [JP] Japan .................................. 55-34464

[51] Int. Cl.³ .............................................. G10L 1/00
[52] U.S. Cl. .................................. 364/513; 179/1 SD; 179/1 SM; 179/18 B
[58] Field of Search ............... 179/1 SD, 1 SB, 1 SM, 179/18 B, 18 ES, 18 FC; 364/513

[56] References Cited

U.S. PATENT DOCUMENTS 4,042,785  8/1977  Rigo et al. ....................... 179/18 FC
4,302,632  11/1981  Vicari et al. .................... 179/18 FC

OTHER PUBLICATIONS

IEC, "Voice Data Entry System," Interstate Electronics Corp., 1978.
"Flexible Voice Response Unit . . . ," Electronics, Feb. 2, 1978, p. 6E.
Flanagan, "Computers That Talk and Listen . . . ," Proc. IEEE, Apr. 1976, pp. 405–415.

Primary Examiner—Emanuel S. Kemeny
Attorney, Agent, or Firm—Sughrue, Mion, Zinn, Macpeak and Seas

[57] ABSTRACT

A multiple channel voice I/O system including a control device and switching mechanism for enabling the system to handle a greater number of user channels than there are recognition inputs. The control unit responds to two types of commands from a host system, the first type indicating a voice output operation and the second type indicating a voice input/recognition operation. During voice output for any user channel, that channel is not connected to any input terminal of the recognition unit. During voice input/recognition operation, the control unit searches for an unoccupied input terminal and connects it to a user channel.

3 Claims, 10 Drawing Figures

MULTIPLE-CHANNEL VOICE INPUT/OUTPUT SYSTEM

BACKGROUND OF THE INVENTION

The present invention relates to a voice input/output (I/O) system for multiple channels.

A voice I/O system disclosed, for example, in FIG. 1 of the British Pat. No. 974,850, published in November, 1964, includes a speech recognition device 3 and an acoustical response generator 4 for one user's channel. As a result, the whole construction becomes bulky and complicated when such an I/O system is provided in one-to-one correspondence to a plurality of users' channels.

In general, each user does not speak to the system when a voice response is made to him. Therefore, when the voice output operation is being performed, the recognition device becomes idle, because processing for recognition is not needed during such voice output operation. It follows that the number of input channels of the recognition unit can be increased by carrying out recognition processing for the other channels during such idle time. However, if the number of input channels is merely increased, there may arise a situation where requests are made for recognition processing from a greater number of input channels than the recognition unit is capable of processing concurrently. Accordingly, the recognition unit may fail to perform the recognition processing resulting in disconnection or repetition of the voice input.

SUMMARY OF THE INVENTION

One object of the present invention is therefore to provide a simplified multiple-channel voice I/O system free from the above-mentioned disadvantages in the conventional system.

According to one aspect of the present invention, there is provided a multiple-channel voice I/O system responsive to two kinds of commands from a host system such as a computer in response to each user's request for the voice I/O operation, comprising:

m (a positive integer larger than 1) users' channels;

a voice response unit connected to the m users' channels for performing the voice output operation for at most m users' channels;

a recognition unit having n (a positive integer smaller than m) input terminals for performing recognition of at most n users' voice inputs through said input terminals connected to said users' channels which have desired the voice input operation;

a switch device disposed between said m users' channels and said input terminals for connecting at most n of said m users' channels to said n input terminals in response to a first of said two kinds of commands from the host system; and a control unit responsive to each command from said host system for controlling the voice response unit, the recognition unit, and the switch device, whereby, in response to a second of said two kinds of commands from said host system, the control unit examines an unoccupied input terminal of the recognition unit, and upon detection of the unoccupied input terminal of the recognition unit, the control unit controls the switch device to connect said user's channel to said unoccupied input terminal of the recognition unit, the voice response unit to perform the voice output operation for the user's channel so as to urge the corresponding user to utter, and the recognition unit to perform the recognition operation for said user's channel.

BRIEF DESCRIPTION OF THE DRAWINGS

The present invention is now described in further detail with reference to the attached drawings wherein.

In the drawings, the same reference numerals denote the same structural elements.

DETAILED DESCRIPTION OF THE PREFERRED EMBODIMENTS

Figure 1:
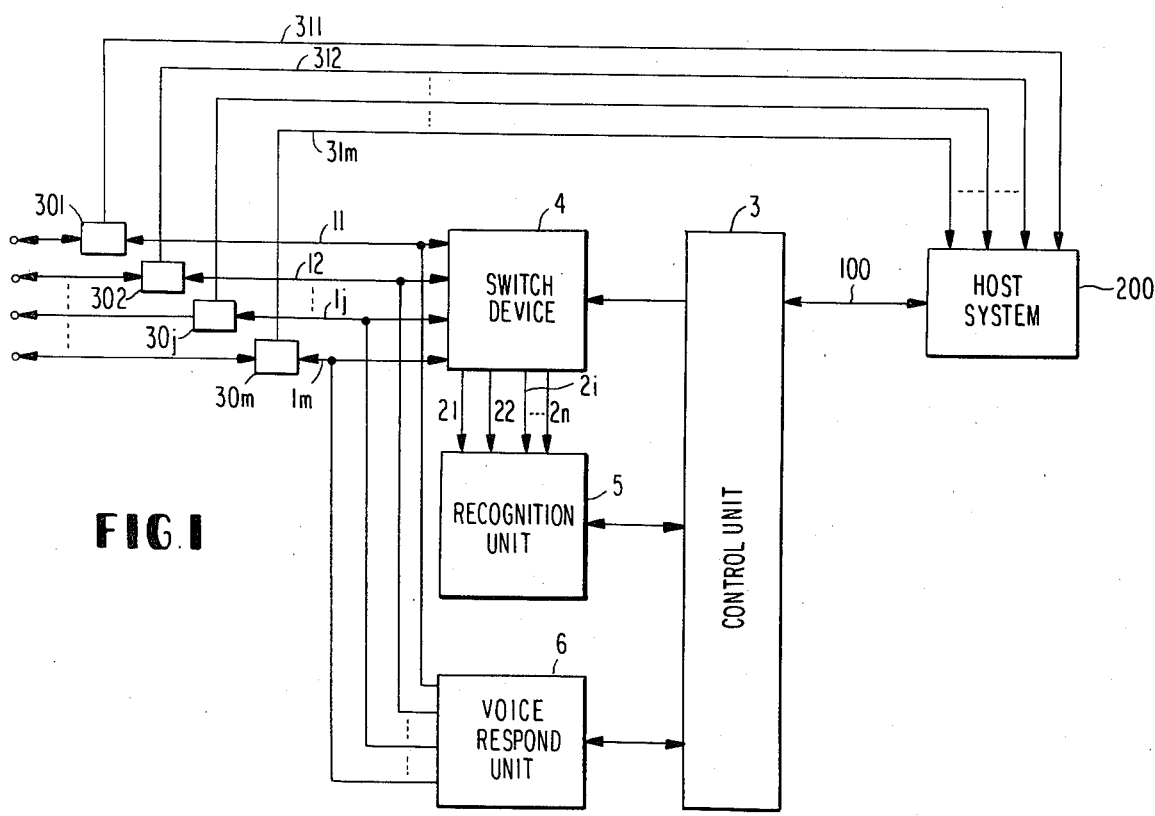
FIG. 1 is a block diagram of one embodiment of the present invention.

Referring to FIG. 1, one embodiment of the invention comprises m (a positive integer larger than 1) users' channels (11, 12 ... 1j, ..., and 1m) connected to network control units 301, 302, ... 30j, ..., and 30m; a voice response unit 6 connected to the m users' channels for performing the voice output operation for at most m users' channels; a recognition unit 5 having n (a positive integer smaller than m) input terminals (21, 22, ... 2i, ..., and 2n) for performing the recognition of at most n users' voice inputs through said input terminals connected to said users' channels which have desired the voice input operation; a switch device 4 disposed between said m users' channels and said input terminals of the recognition unit 5 for connecting at most n users' channels which have desired the voice input operation and selected out of said m users' channels to the n input terminals of the recognition unit 5 in response to a command B given from a host system 200 such as a computer; and a control unit 3 responsive to each of said commands B and commands A through a channel 100 from the host system 200 for controlling the voice response unit 6, the recognition unit 5, and the switch device 4.

The operation of the present embodiment is now described in greater detail referring to FIGS. 2 through 3 and Table 1 given below.

TABLE 1

| One Example of the Operation of the Present System | |
|---|---|
| User: | Call of the present system |
| Response | This is ABC Bank information service. |
| Unit 6: | Please say your account number. "beep" |
| User: | One |
| Unit 6: | "beep" |
| User: | Two |
| Unit 6: | "beep" |
| User: | Three |
| Unit 6: | "beep" |

TABLE 1-continued

One Example of the Operation of the Present System

| User: | Four |
|---|---|
| Unit 6: | Is your account number One, Two, Three, Four? "beep" |
| User: | Yes |
| Unit 6: | Please say your identification number. "beep" |
| User: | Zero |
| Unit 6: | "beep" |
| User: | Nine |
| Unit 6: | "beep" |
| User: | Eight |
| Unit 6: | Is your identification number Zero, Nine, Eight? "beep" |
| User: | Yes |
| Unit 6: | The remainder of your account is 3210 dollars. Thank you for calling ABC bank. |

Figure 10:
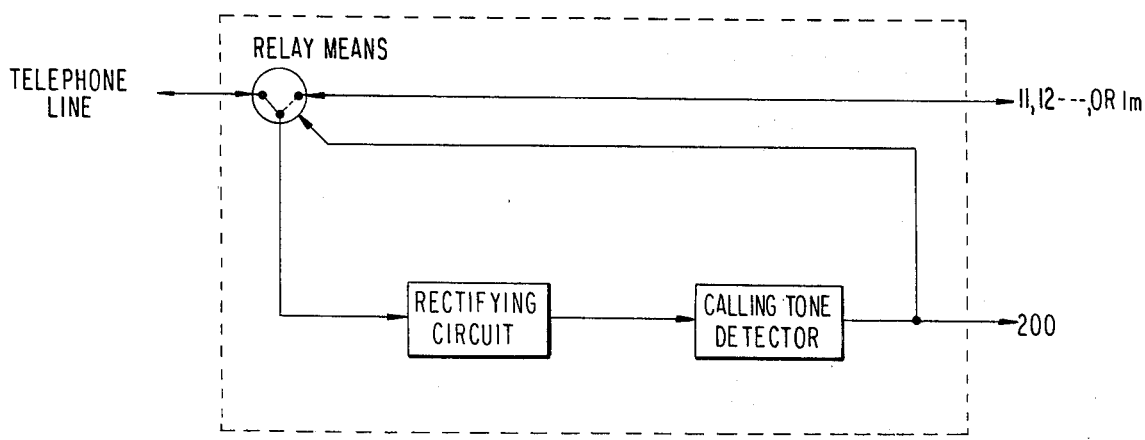
FIG. 10 is a detailed diagram of each network control unit shown in FIG. 1.

A call given from a user j to the present system is detected by the corresponding network control unit 30j (see FIG. 10) comprising relay means, a rectifying circuit, and a calling tone detector. The unit 30j then connects the user j with a user's channel 1j by the use of the relay means and simultaneously notifies the host system 200 through the channel 31j of the detection of said call given from user j. This unit 30j functions as a telephone set so that any call to and from a telephone line may be handled. As soon as the host system 200 has noticed such a user's call given from the unit 30j, the host system 200 issues the command A to the unit 3 to control the unit 6. As a result, the voice response ("This is ABC Bank Information Service. Please say your account number.") is made by the unit 6 to the user j through the user's channel 1j. The host system 200 then gives the command B to the unit 3 to perform the voice input operation. The unit 3 consequently examines an unoccupied input terminal of the unit 5. Upon detection of an unoccupied input terminal 2i, the unit 3 controls the switch device 4 to connect the user's channel 1j with said input terminal 2i and controls the unit 6 to produce a "beep" tone so as to urge the user j to utter. Upon reception of the signal "beep," the user j utters his account number, so that the recognition unit 5 may recognize the user's voice given from the input terminal 2i, give the recognition result to the host system 200, and then make the input terminal 2i idle. The other steps in Table 1 are followed similarly thereafter.

Thus, the input terminal 2i becomes unoccupied while the voice output such as "Is your account number 1 2 3?" is done, so that the unit 5 may perform the voice input for the other users than the user j. In the embodiment, the I/O operation for the network control units 301, 302, ..., and 30m, the input operation for the switch device 4, and the output operation for the unit 6 are performed in analog fashion, while the I/O operation for the other means 3, 5, 200, 311, 32, ..., and 31m in digital fashion.

In this way, each user uses the unit 5 during his utterance but does not use the unit 5 during the voice response by the unit 6. This allows voice I/O operation for a greater number of users' channels than there are input terminals of the recognition unit. The unit 5 is composed of n recognition units for its n input terminals. Each recognition unit may be of the type disclosed in FIG. 14 on page 412 of a paper entitled "Computers That Talk and Listen: Main-Machine Communication by Voice" by James L. Flanagan, PROCEEDINGS OF THE IEEE, April issue, 1976, pp. 405–415. The unit 6 may be composed of the device shown in FIG. 2 on page 340 of a paper entitled "A Multiline Computer Voice Response System Utilizing ADPCM Coded Speech" by Lewis H. Rosenthal, et al., IEEE TRANSACTIONS ON ACOUSTICS, SPEECH, AND SIGNAL PROCESSING, October issue, 1974, pp. 339–352.

Figure 2:
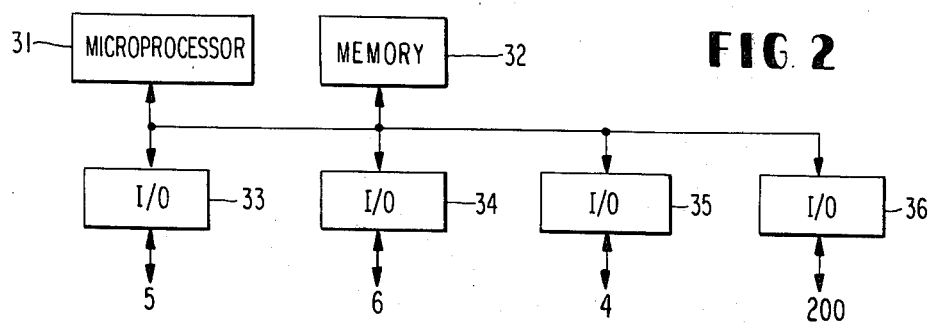
FIG. 2 is a block diagram of one example of a control unit used in the present invention.

The control unit 3 shown in FIG. 1 is described in further detail referring to FIG. 2. The control unit 3 comprises a microprocessor 31, a memory 32, and I/O units 33 to 36. The control unit 3 is disclosed in FIG. 3-1 on page 3-1 of Intel 8080 Microcomputer Systems User's Manual, published by Intel Corporation, September issue, 1975.

Figure 3:
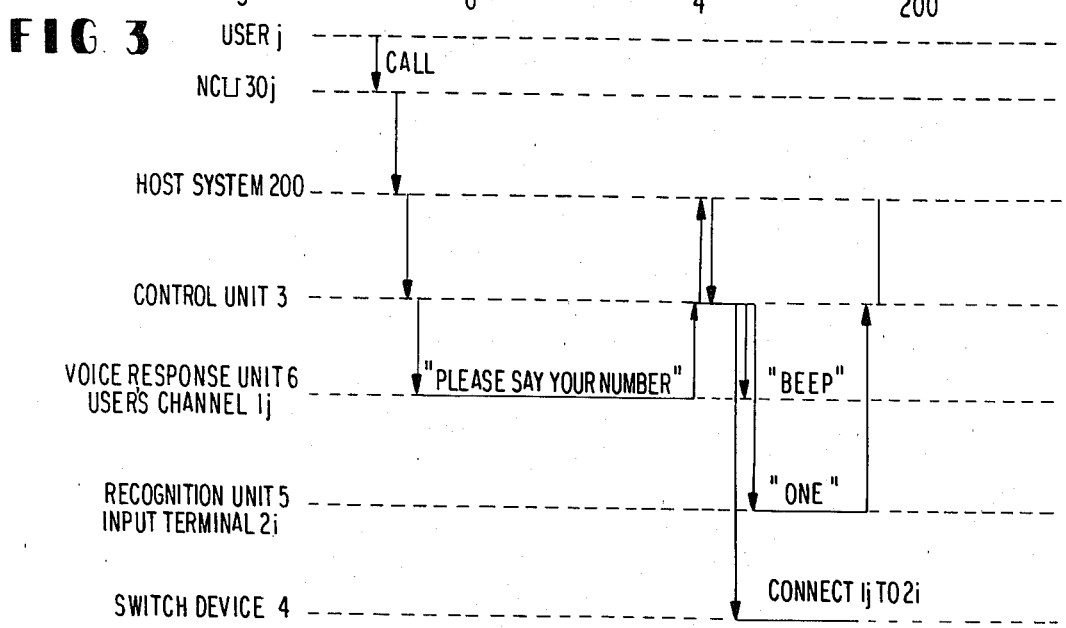
FIG. 3 is a time chart for describing the operation of the invention.
Figure 4:
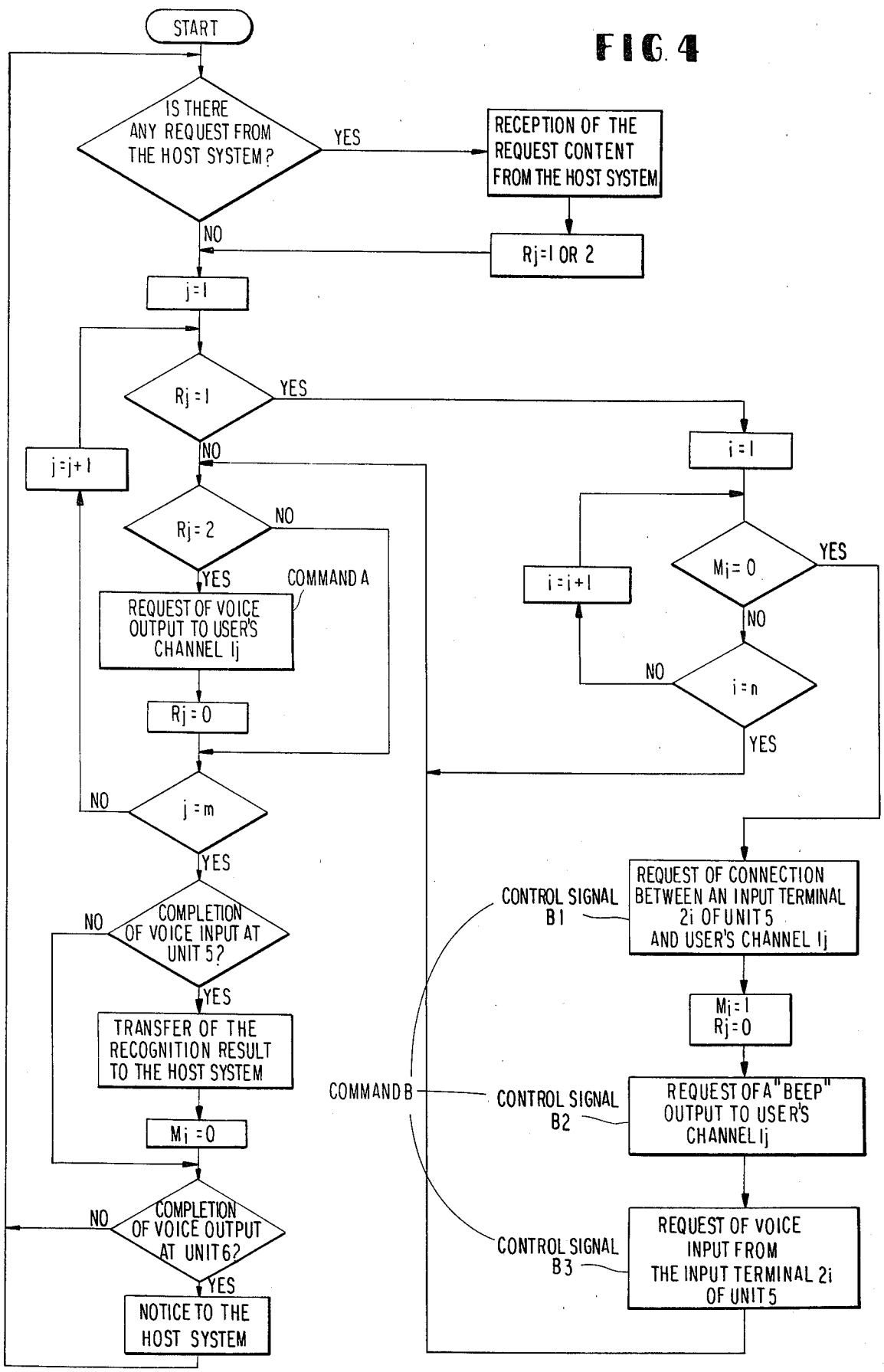
FIG. 4 is a flow chart for describing the operation of the control unit.

The microprocessor 31 performs the program defined by the flow chart shown in FIG. 4 to control the recognition unit 5, the response unit 6, and the switch device 4 depending on a timing sequence as shown in FIG. 3.

The operation of the control unit 3 is now described in detail with reference to FIGS. 1, 3, and 4.

The memory 32 has memory areas $R_j$ (j=1 to m) and $M_i$ (i=1 to n) (both not shown) separately. Each of the memory areas $R_j$ memorizes the state of the corresponding user's channel 1j and each of the memory areas $M_i$ memorizes the state of the corresponding input terminal 2i of the unit 5. More specifically, $R_j=0$ means that no request is generated from the user's channel 1j. $R_j=1$ means that the request for the voice input is generated from the channel 1j. Also, $R_j=2$ means that the request for the voice output is generated from the channel 1j. Next, $M_i=0$ means that the input terminal 2i of the unit 5 is not occupied, whereas $M_i=1$ means that the terminal of the unit 5 is occupied. As soon as the control unit 3 receives the command A for the voice output to the user's channel 1j from the system 200, it then rewrites the memory area $R_j$ as 2. Then, the unit 3 takes out $R_j=2$ so that the command A for the voice output (such as "Please say your number") to the user's channel 1j is given to the unit 6. After this, the unit 3 rewrites the area $R_j$ as 0. Upon completion of said voice output, the unit 3 receives the report that the voice output operation has been completed from the unit 6, and transmits the same to the system 200. When the unit 3 then receives the command B for the voice input to the user j from the system 200, the unit 3 rewrites $R_j$ as 1. Then, $R_j=1$ is taken out by the unit 3, and $M_i=0$ is next sought. When $M_i=0$ is found, a control signal B1 for connecting the user's channel 1j with the input terminal 2i of the unit 5 is given to the device 4. As a result, the areas $M_i$ and $R_j$ of the memory 32 are rewritten as 1 and 0, respectively, which means that the input terminal 21 is occupied and the command B for the user's channel 1j is fetched. A control signal B2 for giving the "beep" tone to the user's channel 1j is then given to the unit 6 so as to urge the user j to utter. Next, a control signal B3 for the voice input from the input terminal 2i of the unit 5 is given to the unit 5. The voice (for instance, "one") given by the user is recognized at the unit 5. The unit 5 gives then the recognition result to the unit 3, so that the result can be sent to the host system and the input terminal 2i may be idle ($M_i=0$). Such operation is made to each user's channel which has made a request for the voice input operation.

As shown in FIG. 4, although the selection of the n channels out of the m users' channels which have desired the voice input operation, is made by orderly scanning the m channels beginning with the first, such selection may be done at random, for example, by the host system based on a "first come, first served" basis.

By controlling the units 5, 6 and the switch device 4 in the manner described above, it becomes possible to avoid the simultaneous requests for the voice inputs from the users of more than the input terminals of the unit 5 concurrently and also to assign the unoccupied input terminal of the unit 5 to the other user's channel while the voice input of the former user is not performed.

Figure 5:
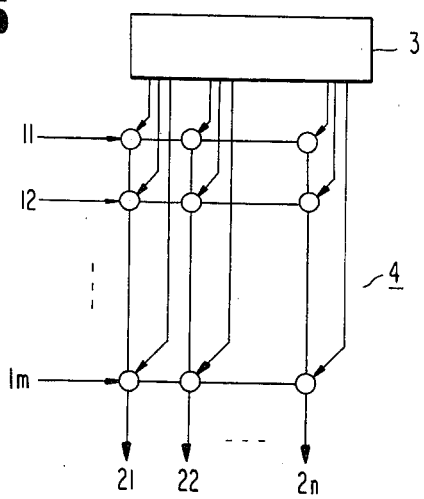
FIG. 5 is a diagram of one example of a switch device for use in the invention.

The switch device 4 is now described in detail referring to FIG. 5. The device 4 has $m \times n$ switches for connecting the users' channels with the input channels of the unit 5 under control of the unit 3. The number of the switches of the device 4 becomes extremely large as m and n become larger.

Figure 6:
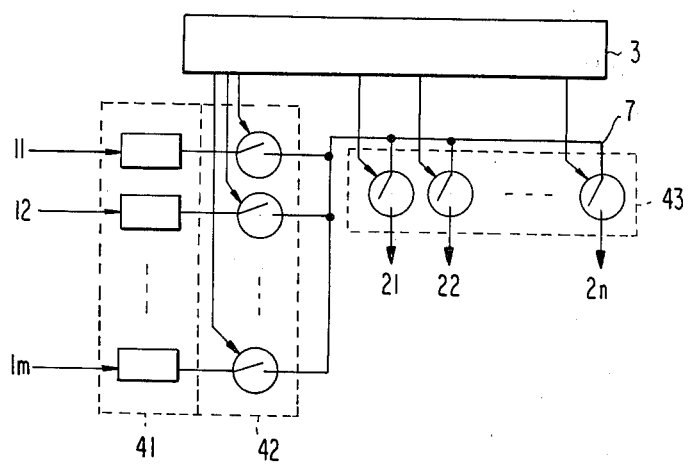
FIG. 6 is a diagram of a second example of the switch device.

FIG. 6 shows another switch device designed to minimize the number of the switches used. The device shown in FIG. 6 comprises an analog-to-digital (A/D) converter 41, a part 42 having m switches, a part 43 having n switches, and a common channel 7.

Figure 7:
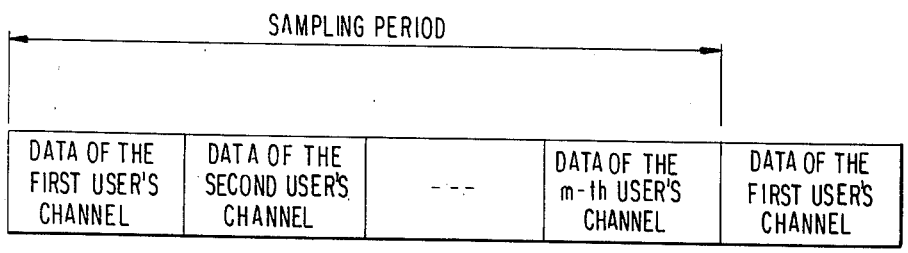
FIG. 7 is a time chart for describing the operation of the device shown in FIG. 6.

The input analog signals are sampled for every user's channel at said converter 41 and the consequent data is maintained during each sampling period. The switches of the part 42 sequentially are closed from the first to the m-th channels at every 1/m sampling period as shown in FIG. 6. The channel 7 has m time slots during one sampling period as shown in FIG. 7. The first user's channel is allotted to the first time slot, the second user's channel to the second time slot, and the m-th user's channel to the m-th time slot, respectively. On the other hand, the part 43 shown in FIG. 6 operates in synchronism with the m time slots, so that one corresponding switch is closed during the time slot allotted to the user's channel selected by the control unit 3 for the connection with the recognition unit. For instance, when the j-th user's channel is to be connected to the i-th input channel of the unit 5, the switch corresponding to the i-th input channel of the unit 5 becomes closed during the j-th time slot. The switching operation in FIG. 6 is made for the time domain, whereas that in FIG. 5 for the space area.

Figure 8:
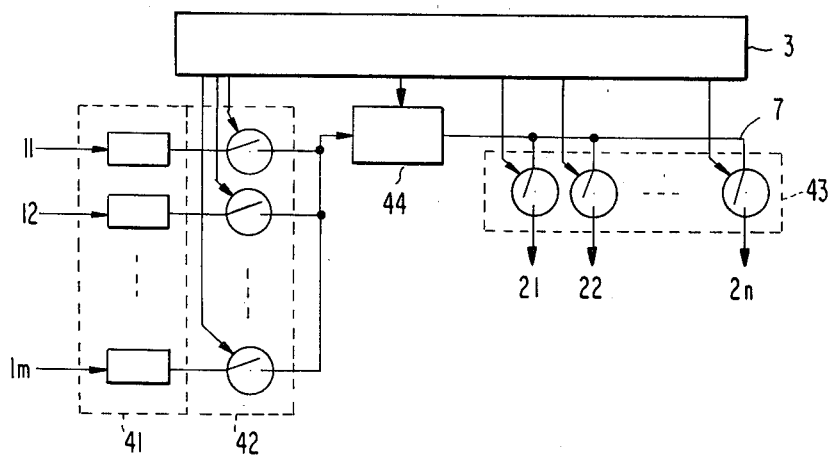
FIG. 8 is a diagram of a third example of the switch device.
Figure 9:
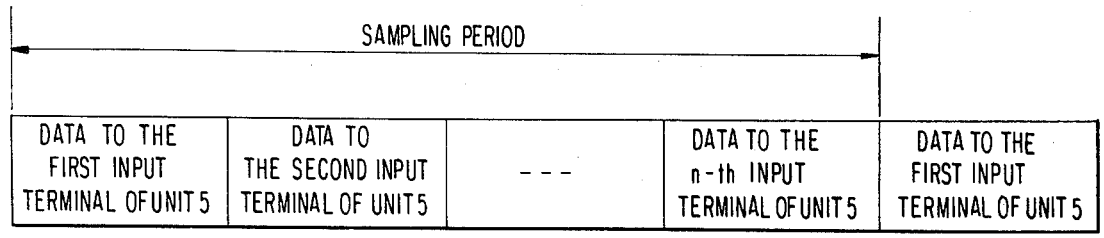
FIG. 9 is a time chart for describing the operation of the device shown in FIG. 8.

Referring to FIG. 8, the third example of the switch device 4 has a memory 44 of $2 \times m$ words, in addition to the structure shown in FIG. 6. Similarly to FIG. 6, the part 42 operates at every 1/m of the sample period, and the consequent data held in the converter 41 is written in the memory 44. The data written in the memory 44 at the previous sampling period is given to the common channel 7 by reading out the n words selected by the control unit 3. As shown in FIG. 9, the channel 7 has n time slots per one sampling period. The first time slot is allotted to (the data to be inputted) the first input terminal of the unit 5 and the n-th time slot to the n-th input terminal of the unit 5, respectively. The part 43 operates in synchronism with the n time slots to sequentially open the first to the n-th switches. For instance, if the j-th user's channel is to be connected to the i-th input channel of the unit 5, the content of the j-th address of the memory 44 is given to the common channel 7 at the i-th time slot.

Thus, the time slots allotted for the common channel 7 may be decreased from m to n.

Although the present invention has been discussed based on the embodiments, these embodiments in no way restrict the scope of the present invention. Many alternatives to the embodiments may be easily considered without departing from the scope of the invention.

What is claimed is:

1. A multiple-channel voice input/output (I/O) system responsive to two kinds of commands from a host system in response to each user's request for the voice I/O operation, comprising:

m (a positive integer larger than 1) users' channels;

a voice response unit connected to the m users' channels for performing the voice output operation for at most m users' channels;

a recognition unit having n (a positive integer smaller than m) input terminals for performing recognition of sounds on at most n users' voice inputs through said input terminal connected to said users' channels which have desired the voice input operation;

a switch device disposed between said m users' channels and said n input terminals for connecting at most n of said m users' channels which have desired the voice input operation to the n input terminals of the recognition unit in response to a first command of said two kinds of commands from the host system; and a control unit responsive to each command from said host system for controlling the voice response unit, the recognition unit, and the switch device, whereby, in response to a second command of said two kinds of commands from said host system, the control unit controls the voice response unit to perform the voice output operation for a user's channel, and, in response to said first command, the control unit searches for an unoccupied input terminal of the recognition unit, and upon detection of an unoccupied input terminal of the recognition unit, the control unit controls the switch device to connect said user's channel to said unoccupied input terminal of the recognition unit, the voice response unit to transmit a first signal on said user's channel so as to urge the corresponding user to utter, and the recognition unit to perform the recognition operation for said user's channel.

2. A multiple-channel voice I/O system as defined in claim 1, wherein said first signal transmitted on said user's channel so as to urge the corresponding user to utter is a beep signal.

3. A multiple-channel voice I/O system as defined in claim 1, wherein said control unit controls said switch device to disconnect a particular user's channel from said recognition unit upon transmission of a voice output on said particular user's channel by said voice response unit.

* * * * *